(No Model.)
J. R. STEITZ
SPRINKLER.
No. 427,376. Patented May 6, 1890.
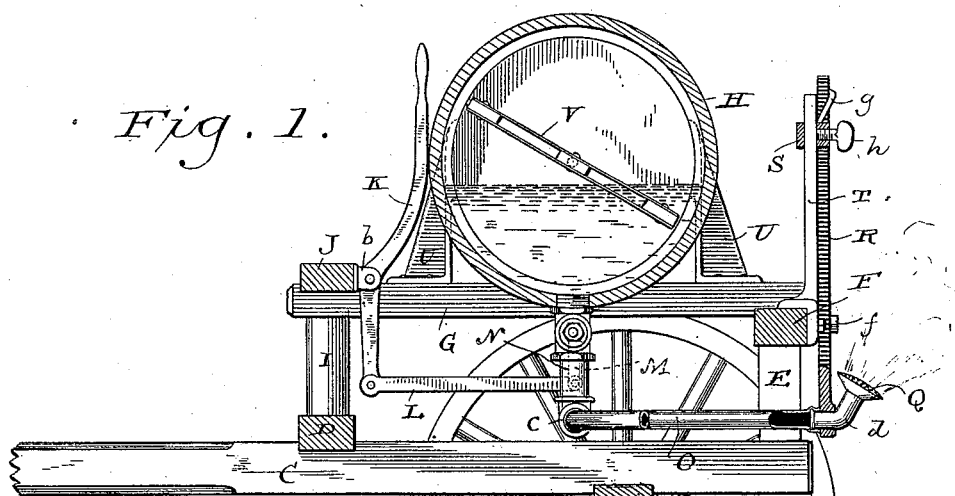
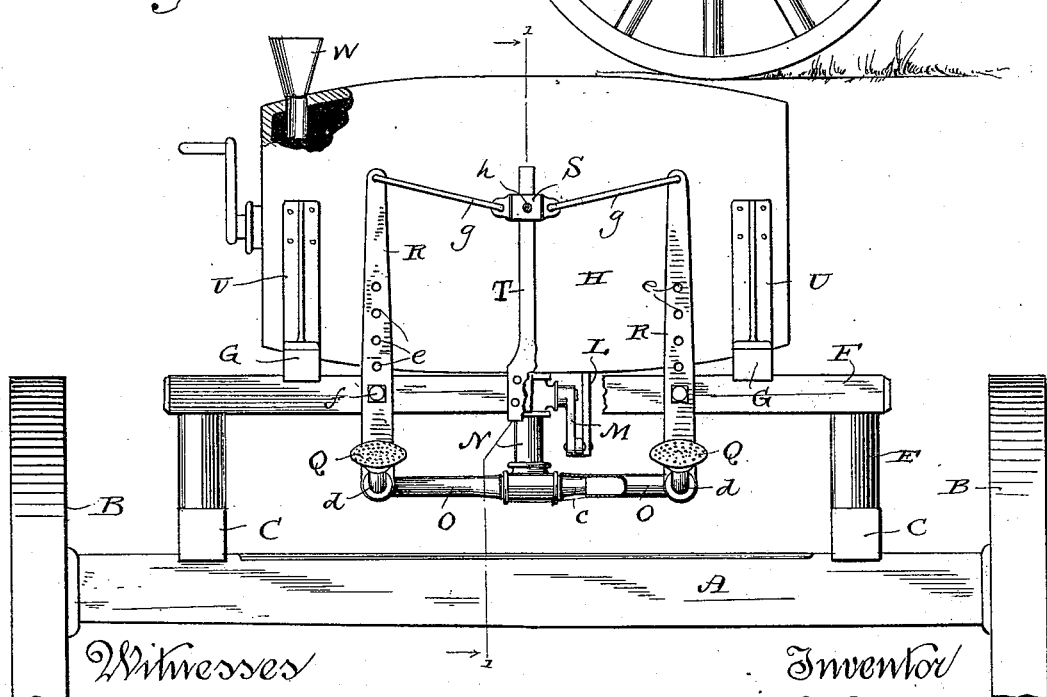
Witnesses
Geo. W. Young
N. E. Oliphant
Inventor
Jacob R. Steitz
By Stout & Underwood
Attorneys

UNITED STATES PATENT OFFICE.

JACOB R. STEITZ, OF ST. FRANCIS, WISCONSIN.

SPRINKLER.

SPECIFICATION forming part of Letters Patent No. 427,376, dated May 6, 1890.

Application filed October 16, 1889. Serial No. 327,205. (No model.)

*To all whom it may concern:*

Be it known that I, JACOB R. STEITZ, of St. Francis, in the county of Milwaukee, and in the State of Wisconsin, have invented certain new and useful Improvements in Sprinklers; and I do hereby declare that the following is a full, clear, and exact description thereof.

My invention relates to sprinklers, being especially designed for distributing liquid poison upon plants infested by destructive insects; and it consists in certain peculiarities of construction and combination of parts to be hereinafter described with reference to the accompanying drawings and subsequently claimed.

In the drawings, Figure 1 represents a longitudinal vertical section of a sprinkler constructed according to my invention, the section being taken on line 1 1 of the succeeding figure; and Fig. 2, a rear elevation, partly broken away.

Referring by letter to the drawings, A represents an axle for wheels B, and fast to the axle are thills C, the latter being united in front of said axle by means of a brace D. Projecting up from the rear ends of the thills are posts E, that support a cross-piece F, and secured to this cross-piece are the rear ends of longitudinal supports G for a barrel-shaped tank H, the front ends of these supports being secured to posts I, that project up from the brace D.

The parts A, B, C, D, E, F, G, and I form a skeleton cart for the tank H, and thus the sprinkler is made comparatively light without any sacrifice of strength, while at the same time I economize in the cost of manufacture.

Secured to the front ends of the supports G is a cross-bar J, provided with a bracket *b*, and pivotally united to this bracket is a lever K, connected by a link L and crank M to the valve of a three-way cock N, the latter being fitted to the tank H. Connected to the lateral branches *c* of the cock N are flexible tubes O, that in turn connect with the cranked shanks *d* of rose-heads Q, these shanks being fitted to vertically-disposed arms R, which latter are pivoted to the cross-piece F and provided with a series of openings *e*, whereby a vertical adjustment with relation to the pivots *f* may be readily effected, accordingly as it may be found desirable to raise or lower the rose-heads to accommodate the sprinkler to plants of varying height. By having the rose-heads cranked the spray therefrom is discharged in an upward direction and falls in a shower upon the plants, whereby I obtain a better distribution of the fluid. The arms R are connected by links *g* with a slide S, vertically adjustable on a standard T, secured to the cross-piece F, midway between the ends thereof, said slide being held in its adjusted position by means of a set-screw *h*, as best illustrated in Fig. 1. The adjustment of the slide S moves the arms R on their pivots, and thus the rose-heads Q are moved in or out to correspond with varying distances between plant-rows. The tank H is shored by means of braces U, fastened to the longitudinal supports G, and a crank-actuated stirrer V is arranged to rotate within said tank.

The material to be sprinkled is introduced into the tank through a funnel W and mixed by the stirrer V, the latter being afterward revolved from time to time to prevent the heavy particles of the mixture from settling.

The operator rides upon the tank H and controls the discharge therefrom by means of the lever K, that is connected by the link and crank L M to the three-way cock N, having the flexible connections O with the vertically and laterally adjustable rose-heads Q, above described.

Having thus described my invention, what I claim as new, and desire to secure by Letters Patent, is—

In a sprinkler, the combination of a cart, a tank supported thereon and provided with a three-way discharge-cock, vertically-disposed arms pivoted to the cart, rose-heads carried by the arms, flexible pipes connecting the rose-heads with said cock, a standard, a slide vertically adjustable on the standard, and links connecting said slide and arms, substantially as set forth.

In testimony that I claim the foregoing I have hereunto set my hand, at Milwaukee, in the county of Milwaukee and State of Wisconsin, in the presence of two witnesses.

JACOB R. STEITZ.

Witnesses:
N. E. OLIPHANT,
WM. KLUG.